US012291384B2

(12) United States Patent
Voellmicke

(10) Patent No.: US 12,291,384 B2
(45) Date of Patent: May 6, 2025

(54) ONE OR MORE BLISTER PACKAGES CONTAINING ACTIVE MATERIAL AND METHODS OF MAKING AND USING SAME

(71) Applicant: CSP Technologies, Inc., Auburn, AL (US)

(72) Inventor: Craig Voellmicke, New York, NY (US)

(73) Assignee: CSP TECHNOLOGIES, INC., Auburn, AL (US)

( * ) Notice: Subject to any disclaimer, the term of this patent is extended or adjusted under 35 U.S.C. 154(b) by 0 days.

(21) Appl. No.: 18/356,338

(22) Filed: Jul. 21, 2023

(65) Prior Publication Data

US 2023/0356906 A1 Nov. 9, 2023

Related U.S. Application Data

(63) Continuation of application No. 17/807,161, filed on Jun. 16, 2022, now Pat. No. 11,745,927, which is a continuation of application No. 17/250,887, filed as application No. PCT/US2019/052074 on Sep. 20, 2019, now Pat. No. 11,396,413.

(60) Provisional application No. 62/733,751, filed on Sep. 20, 2018.

(51) Int. Cl.

| | |
|---|---|
| ***B65D 75/36*** | (2006.01) |
| ***A61J 1/03*** | (2023.01) |
| ***B65B 11/52*** | (2006.01) |
| ***B65D 81/26*** | (2006.01) |

(52) U.S. Cl.

CPC ............ *B65D 75/367* (2013.01); *A61J 1/035* (2013.01); *B65B 11/52* (2013.01); *B65D 81/266* (2013.01)

(58) Field of Classification Search

CPC ..... B65D 75/367; B65D 81/266; B65B 11/52; A61J 1/035

USPC ........................................................... 53/453

See application file for complete search history.

(56) References Cited

U.S. PATENT DOCUMENTS 3,343,897 A * 9/1967 Keller ................. B65D 75/367 206/439

4,191,482 A 3/1980 Ploeger (Continued)

FOREIGN PATENT DOCUMENTS

CN 1057998 A 1/1992

CN 1946609 A 4/2007

(Continued)

OTHER PUBLICATIONS

International Search Report issued in International Application No. PCT/US2019/052074, dated Nov. 26, 2019.

*Primary Examiner* — Sameh Tawfik

(74) *Attorney, Agent, or Firm* — Mark T. Vogelbacker; Eckert Seamans Cherin & Mellott, LLC

(57) ABSTRACT

A blister pack having a backing having a first side and an opposing second side. Each of the first and second side is flat or planar. The blister pack can also include a cover having a first side and an opposing second side. At least a portion of the second side of the cover is adhered to the first side of the backing to form a sealed package for containing product. The cover can include at least one blister. The blister pack can also include an active member positioned within each blister. Each active member can be in the form of a ring with an opening extending therethrough or a depression formed therein.

10 Claims, 6 Drawing Sheets

(56) References Cited

U.S. PATENT DOCUMENTS

| | | | | |
|---|---|---|---|---|
| 4,574,954 | A * | 3/1986 | Reid | B65D 75/327 206/532 |
| 5,911,937 | A | 6/1999 | Hekal | |
| 6,080,350 | A | 6/2000 | Hekal | |
| 6,124,006 | A | 9/2000 | Hekal | |
| 6,130,263 | A | 10/2000 | Hekal | |
| 6,194,079 | B1 | 2/2001 | Hekal | |
| 6,214,255 | B1 | 4/2001 | Hekal | |
| 6,279,736 | B1 | 8/2001 | Hekal | |
| 6,486,231 | B1 | 11/2002 | Hekal | |
| 7,005,459 | B2 | 2/2006 | Hekal | |
| 8,142,603 | B2 * | 3/2012 | Sagona | B65D 81/2076 156/308.2 |
| 10,010,480 | B2 * | 7/2018 | Hosoi | B32B 27/32 |
| 10,828,234 | B2 | 11/2020 | Laemmle et al. | |
| 11,396,413 | B2 | 7/2022 | Voellmicke | |
| 2011/0217430 | A1 * | 9/2011 | Chau | C08J 9/0004 206/524.4 |
| 2013/0153459 | A1 * | 6/2013 | Yoshita | B65D 81/26 206/530 |
| 2013/0334074 | A1 | 12/2013 | Wada et al. | |
| 2015/0191288 | A1 * | 7/2015 | Jolley | A61M 15/0045 206/438 |
| 2016/0039955 | A1 | 2/2016 | Klein | |
| 2016/0051443 | A1 | 2/2016 | Depla | |
| 2020/0030185 | A1 | 1/2020 | Laemmle et al. | |

FOREIGN PATENT DOCUMENTS

| | | | |
|---|---|---|---|
| CN | 102869712 | A | 1/2013 |
| CN | 203845213 | U | 9/2014 |
| CN | 104470570 | A | 3/2015 |
| CN | 106458410 | A | 2/2017 |
| CN | 207467325 | U | 6/2018 |
| DE | 1544098 | A1 | 1/1971 |
| DE | 20204067 | U1 | 7/2003 |
| EP | 0466068 | A2 | 1/1992 |
| EP | 3599188 | B1 | 9/2020 |
| EP | 3599176 | B1 | 12/2020 |
| JP | H0592171 | U | 12/1993 |
| JP | 2004090966 | A | 3/2004 |
| JP | 2005289390 | A | 10/2005 |
| WO | 2018145099 | A1 | 8/2018 |

* cited by examiner

ONE OR MORE BLISTER PACKAGES CONTAINING ACTIVE MATERIAL AND METHODS OF MAKING AND USING SAME

CROSS-REFERENCE TO RELATED APPLICATION

The present application is a continuation of U.S. patent application Ser. No. 17/807,161 filed Jun. 16, 2022 and titled "ONE OR MORE BLISTER PACKAGES CONTAINING ACTIVE MATERIAL AND METHODS OF MAKING AND USING SAME", which is a continuation of Ser. No. 17/250,887 filed Mar. 19, 2021 and titled "ONE OR MORE BLISTER PACKAGES CONTAINING ACTIVE MATERIAL AND METHODS OF MAKING AND USING SAME", which is a U.S. National Phase of International Application No. PCT/US2019/052074, filed Sep. 20, 2019, which claims priority to U.S. Provisional Patent Application No. 62/733,751, filed Sep. 28, 2018, the entire disclosure of each is hereby incorporated by reference in its entirety.

FIELD

The presently disclosed technology relates to blister packages for product, such as one or more pills, tablets, capsules, and the like. In one embodiment, each package has a cover, optionally formed of a thermoformed material, bonded to backing, optionally including an aluminum foil component, and an active member or material designed to provide benefits to the product in the package and reduce, maintain, and/or conserve the overall volume of each blister.

BACKGROUND AND DESCRIPTION OF RELATED ART

Blister packaging is commonly used to package oral solid dose medications, vitamins, probiotics, pills, tablets, capsules, and the like. Prior art packaging includes a thermoformed material, which holds the product, and a foil attached to an open side thereof to enclose the product, such as that described in U.S. Pat. No. 4,574,954 and German Patent Publication No. 202 04 067 U1. "Coldform" is also a blister packaging option, where aluminum foil is used for the formed part of the blister instead of a thermoformed material.

Blister packaging or "blister packs" are typically used both by pharmaceutical companies and smaller health care facilities. Blister packs are also manufactured by companies in the business of providing unfilled blister packs for filling by third parties.

It is known to place a desiccant or scavenger extruded film in a blister pack. The size and shape of the desiccant or scavenger extruded film may be called the footprint of the film, and in the prior art is at least slightly less than the opening of the blister containing the product. One such blister package with desiccant film is disclosed in U.S. Pat. No. 6,279,736 (Hekal), which is hereby incorporated by reference in its entirety.

FIGS. 1 and 2 show another prior art blister pack 10 having four blisters 18, where a thermoplastic layer or member 14 forms each blister 18 and is adhered to a foil backing 12. Extruded desiccant film 16 having a width WPA (see FIG. 2) of less than that of a single blister 18 is adhered to the foil backing 12.

FIGS. 3 and 4 show yet another prior art configuration, where product 17 (e.g., a pill) is placed on top of the active member 16, where "x" represents the height of the product 17 and "y" represents that height of the active member 16. In such a configuration, the desiccant or scavenger extruded film 16 is placed on or is in contact with the foil surface that faces and comes in contact with the capsule or tablet 17. The desiccant or scavenger capacity of the extruded film 16 is determined by the volume of film, namely the length, width and thickness of the film. The greater the thickness of film 16, the deeper (e.g., higher) the blister 18 needs to be in order to accommodate the capsule or tablet 17. A challenge to making the blister 18 deeper is that the wall thickness can become thinner (e.g., as x+y in FIG. 3 is greater), thus reducing the barrier properties of the material. Making the blister 18 deeper can also reduce the mechanical strength of the blister 18.

BRIEF SUMMARY

The presently disclosed technology reduces or eliminates the above and other challenges of the prior art.

In one embodiment, the presently disclosed technology provides the benefits of an active member without increasing the depth (e.g., height) of the blister. Optionally, this can be achieved by making the active member in the form of a circle, a hoop, a ring, or a donut, such that the product (e.g., a pill or tablet) can fit within an opening or depression of the active member. Such a design allows the product to sit near or on the backing layer of the blister pack, thereby providing the benefits of the active member while simultaneously providing the same overall thickness as conventional blister product.

By eliminating the need in the prior art of increasing the depth of the thermoform or coldform wall, the wall thickness of the cover of the present embodiment can be thicker and, therefore, provide more barrier protection as compared to certain prior art.

In addition, the presently disclosed technology can save material and reduce machine cycle times versus deeper blister designs.

The presently disclosed technology can also result in the elimination of additional steps or packaging used in deeper blister designs, such as nitrogen purge and secondary packaging such as a pouch with an external desiccant sachet.

In one embodiment, the active member can be employed or used in a stepped blister design, such as that shown in FIGS. 3-7 of International Publication No. WO 2018/0145099 (Voellimicke), which is hereby incorporated by reference in its entirety. Optionally, in such an embodiment, contact between the product and the active member is eliminated, or at least reduced. In some cases, changes to contact surfaces of packaging for an oral solid dose (or other drug products) that has already been cleared by regulatory agencies can lead to longer testing and regulatory timelines. This embodiment of the presently disclosed technology could allow adoption of product for existing applications with less testing and/or regulatory review.

In another aspect, the presently disclosed technology can include a blister pack including a backing and a cover attached to the backing. The cover and backing in combination can form at least one sealed cavity for containing product. The blister pack can include at least one active member within the at least one sealed cavity. The active member can be in the form of a ring with an opening extending therethrough.

In still another aspect, the presently disclosed technology can include a method of making a blister pack. In one embodiment, the method can include providing a thermoformed or foil cover including a plurality of blisters, placing product in each blister, placing at least one active member in each blister such that the at least one active member surrounds and/or support the product, and attaching a backing to the cover to form a sealed cavity around the product and the at least one active member in each blister.

In yet another embodiment, the presently disclosed technology is directed to an active member for a blister pack. The active member can be in the form of a ring with an opening extending therethrough. The active member can be configured to surround or support a product within a thermoformed cover of the blister pack.

Optionally, in any embodiment, the product contained in a blister of a blister pack may include a pill, which is optionally a medicine, a nutritional supplement, or a probiotic, for example.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." A first direction $D_1$ and a second direction $D_2$ are shown in certain drawings for reference and clarity only, and are not part of the structure of the presently disclosed technology. The terminology includes the words noted above, derivatives thereof and words of similar import.

Figure 5:
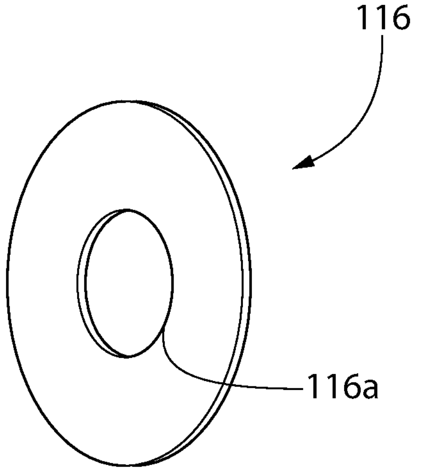
FIG. 5 is a perspective view of an active member according to one optional embodiment of the presently disclosed technology.
Figure 6:
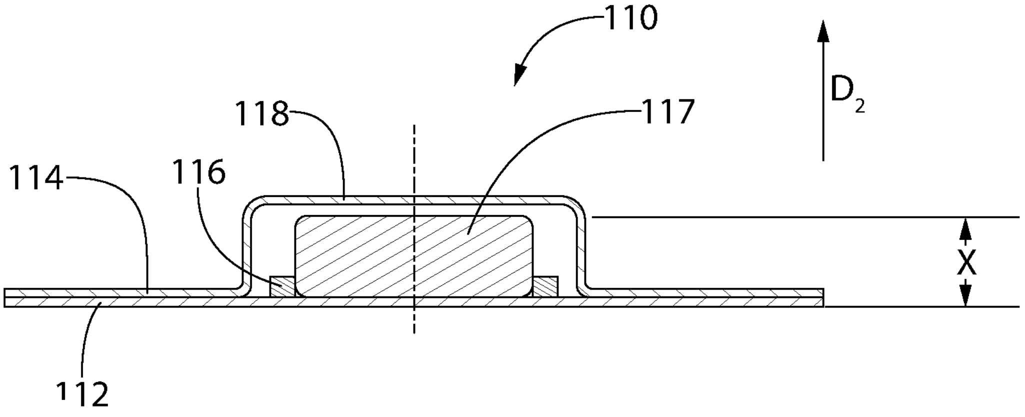
FIG. 6 is a cross-sectional side elevation view of the active member shown in FIG. 5 in a blister pack and surrounding at least a portion of a product.
Figure 7:
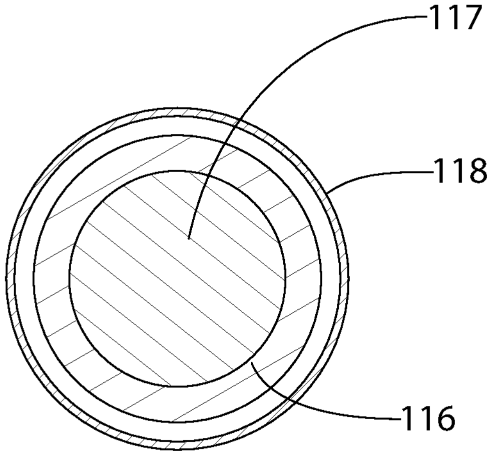
FIG. 7 is a top plan isolated view of a blister of the blister pack shown in FIG. 6.

Referring now in detail to the various figures, wherein like reference numerals refer to like parts throughout, FIGS. 5-7 illustrate one embodiment of a blister packaging or pack, generally designated 110, of the presently disclosed technology. The blister pack 110 can include a backing 112, a cover 114, and at least one active member 116. The blister pack 110 can enclose, preserve and protect one or more products 117, such as oral solid dose medications, vitamins or other nutritional supplements, foodstuff, small consumer goods, probiotics, etc. Such products may be in the form of pills, e.g., tablets, capsules, and the like.

The backing 112 can have a first side or surface and an opposing second side or surface. Optionally, at least the first side of the backing 112 being flat or planar. In one embodiment, each of the first and second sides of the backing 112 are flat or planar, such that each of the first and second sides extends in a plane, which are at least slightly spaced-apart. In one embodiment, the backing is formed at least in part of foil, such as aluminum foil, and/or of a plastic material. Optionally, the backing can include paperboard.

The cover 114 can have a first side or surface and an opposing second side or surface. Optionally, at least a portion of the first and second sides of the cover 114 are flat or planar. At least a portion of the second side of the cover can be attached or adhered to the first side of the backing to form a sealed package for containing product(s).

The cover 114 can have the same or a different thickness (as measured in the direction of $D_2$, see FIG. 6) as the backing 112. In one embodiment, the cover 114 is made or formed of a formable web. In one embodiment, the formable web is made from a thermoplastic material, such as a thermoformed film. Optionally, the cover 114 can be formed of polyvinyl chloride (PVC), which can be transparent or opaque. In one embodiment, the cover 114 and/or the backing 112 can be formed on two or more layers. Thus, the cover 114 can be formed of a polymeric material (e.g., made by thermoforming) or a foil material (e.g., made by cold-forming), for example.

The cover 114 includes or is formed to have at least one blister, generally designated 118. For example, the cover 114 can include two or more spaced-apart blisters 118. The embodiment shown in FIGS. 5-7 shows the cover 114 having only one blister 118. However, the cover 114 can have four, spaced-apart, identical blisters 118, or more or fewer blisters and one or more of the blisters can have a different size and/or shape than another one of the blisters 118 of the blister pack 110, depending upon the particular need. Optionally, each blister 118 can have at least a partial egg shape or a bulbous shape. Alternatively, in one embodiment, each blister 118 can have at least a partial plateau shape (e.g., when viewed from the side, see FIG. 6) or a cylindrical shape. When the cover 114 is attached to the backing 112, a sealed cavity is formed within or by each blister 118.

In one embodiment, each blister 118 can define a longitudinal or long axis that extends parallel to at least one outer edge of the blister pack 110. Optionally, and more specifically, the longitudinal axis of each blister 118 can extend parallel to two opposing lateral sides of the blister pack 110 and perpendicularly to top and bottom sides of the blister back. However, the arrangement or orientation of the blister(s) 118 within the blister pack 110 is not limited to that shown and described herein, as other configurations are possible depending upon the particular need.

In one embodiment, the at least one active member 116 is positioned within each blister 118. Optionally, the active member 116 can be in the form of an extruded film, such as a desiccant entrained polymer film or an oxygen scavenger entrained polymer film. In one embodiment, one or each active member 116 can be in the form of a rectangular or square piece of film.

Figure 8:
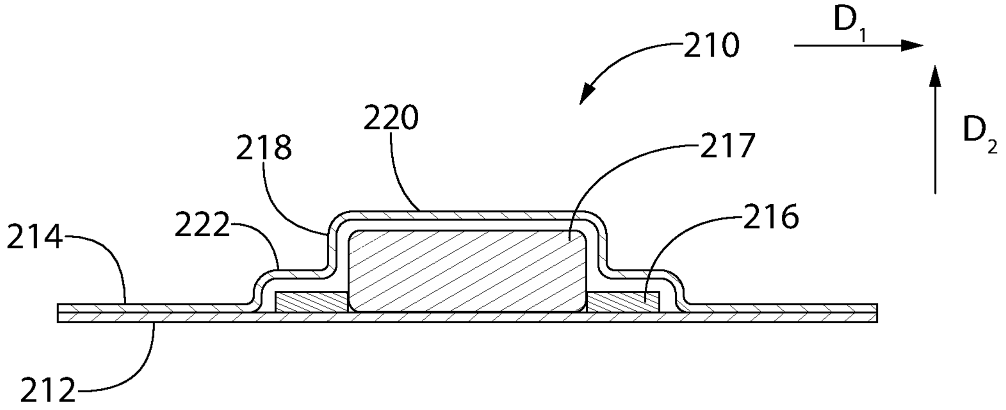
FIG. 8 is a cross-sectional side elevation view of a blister pack according to another embodiment of the presently disclosed technology.

In another embodiment, as shown in FIG. 5, one or each active member 116 can be in the form of a ring or a donut with an opening 116*a* extending therethrough. The shape of the opening 116*a* can be circular, or another shape depending upon the needs of the particular application. Optionally, the product 117 can be placed within the opening 116*a*. The inner periphery of the opening 116*a* optionally can be positioned at, near or even abut against an outer periphery of the product 117, as shown in FIGS. 6 and 8. Alternatively, the inner periphery of the opening 116*a* can be spaced-apart from the outer periphery of the product 117, such that the opening 116*a* is measurably larger than the outer periphery of the product 117 (such as but not limited to that shown in FIGS. 9 and 10), such that there is at least a slight gap or spacing therebetween.

The depth of the active member 116 can depend upon the needs of the particular application and/or that product 117, as can the circumference of the opening 116*a* and/or the outer perimeter of the active member 116 or the diameter of the active member 116.

The active member(s) 116 is not limited to the particular size, shape and/or configuration shown and described herein, as other shapes, for example, can be employed. For example, one or each active member 116 can have any shape as its outer perimeter (e.g., rectangular) and/or can include a depression within an interior thereof. The depression can replace the opening 116*a* shown in FIG. 5, and can support or contact the product 117. Optionally, the depression may only be visible or accessible from one side of the active member 116. In one embodiment, the depression is formed on an otherwise flat or planar surface of the active member 116, and can have a circular or oval shape when viewed from above.

In any embodiment, the at least one active member 116 is not a pill or other medicament.

Optionally, the active member 116 is adhered, e.g., using an adhesive, to the first side of the backing 112. For example, the active member 116 can include a first or top side and an opposing second or bottom side. The second side of the active member 116 can contact the first side of the backing 112. Alternatively, the active member 116 can be heat staked (without an adhesive) to the first side of the backing 112. The process of heat staking film onto a substrate is described in detail in U.S. Pat. No. 8,142,603 (Sagona), which is incorporated herein by reference in its entirety. As another alternative, the active member 116 is not adhered to the backing 112. In such an embodiment, the active member 116 is loosely placed in the blister 118 after the product 117 is placed in the blister 118. In one embodiment, the active member 116 is in the range of 0.2-1.2 mm, optionally 0.2-1.0 mm, optionally 0.2-0.8 mm, optionally 0.2-0.6 mm, optionally 0.2-0.4 mm, and optionally approximately 0.3 mm, in thickness or height (i.e., the direction shown by $D_2$ in FIG. 6).

Figure 1:
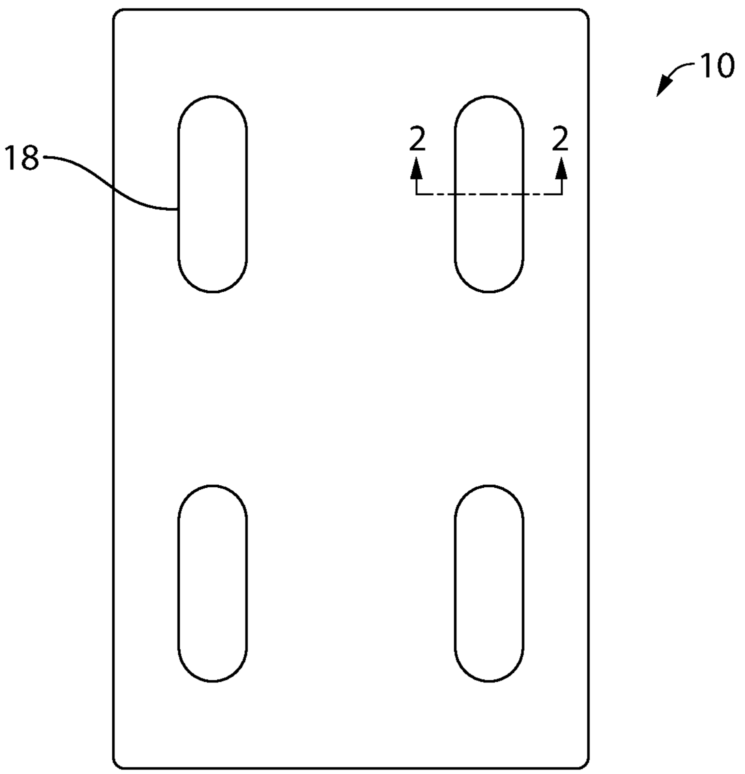
FIG. 1 (PRIOR ART)
FIG. 1 is a top plan view of a blister pack of the prior art.
Figure 2:
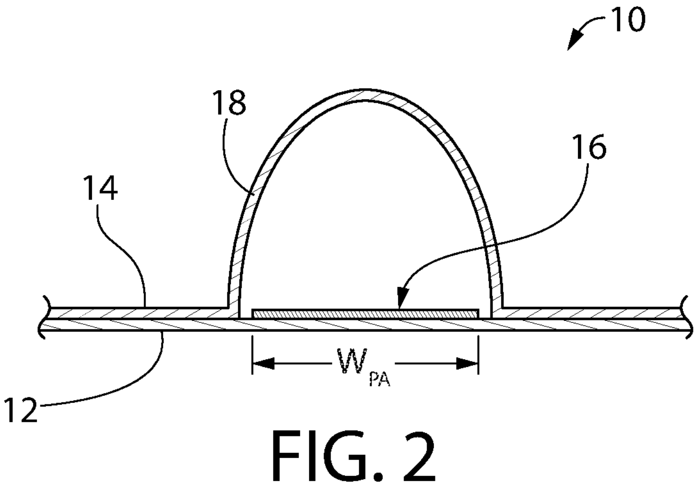
FIG. 2 (PRIOR ART)
FIG. 2 is a cross-sectional side elevation view taken from line 2-2 of FIG. 1, which shows extruded film having a width less than that of a width of an individual blister.
Figure 3:
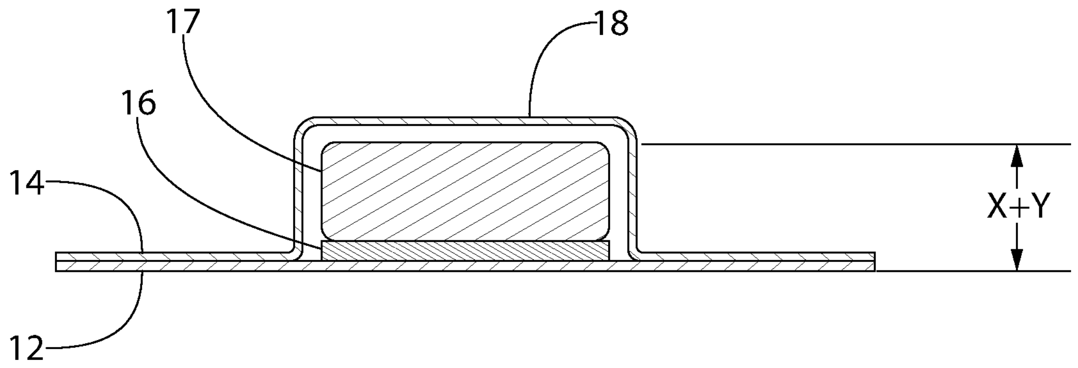
FIG. 3 (PRIOR ART)
FIG. 3 is a cross-section side elevation view of a blister pack according to the prior art, wherein a product is placed on top of an active member.
Figure 4:
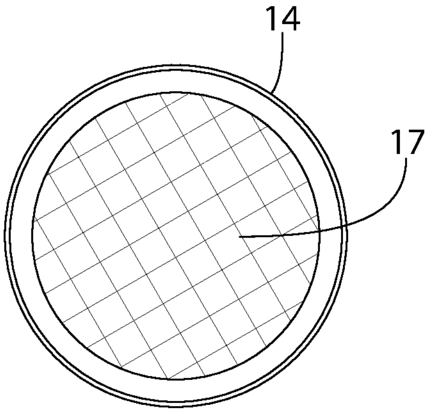
FIG. 4 (PRIOR ART)
FIG. 4 is a top plan isolated view of a blister of the blister pack shown in FIG. 3.

The benefits of the above-described uniquely configured active member(s) 116 are numerous. For example, the active member(s) 116 of the presently disclosed technology permits the depth or height of each blister to be lowered or reduced, as compared to when the product is placed directly on top of the active member (such as that shown in FIG. 3). For example, as shown in FIG. 6, the height of the active member 116 does not add to the depth or height of the blister 118, which only needs to accommodate the height "x" of the product 117. Because the conventional depth or height is maintained, the cover 114 is not thinned and can retain its beneficial barrier properties. Further, use of the active member(s) 116 of the present embodiment saves material, as additional material to form the deeper or higher cover 114 is not needed, increases or preserves the mechanical strength or rigidity of the cover 114, and/or machine cycle times are reduced as compared to deeper blister designs. The presently disclosed technology can also result in the elimination of additional steps or packaging used in deeper blister designs, such as nitrogen purge and secondary packaging such as a pouch with an external desiccant sachet.

In one embodiment, each active member 116 contains a desiccant. This would be an embodiment where moisture absorption is desired. However, where moisture absorption is not desired, the active member 116 can include alternative active agents. For example, in another embodiment, the active member 116 contains a material selected from the group consisting of activated carbon, carbon black, ketcham black and diamond powder. In a further embodiment, an active agent including one or more layers of the active member 116 contains a material such as absorption microspheres, BaTiO3, SrTiO3, SiO2, Al2O3, ZnO, TiO2, MnO, CuO, Sb2O3, silica, calcium oxide and ion exchange resins. In yet another embodiment, the absorbing or adsorbing agent containing layer of the active member 116 contains two or more types of absorbing or adsorbing agents. The suitable absorbing agent is chosen so as to achieve absorption of the desired vapor or gas for the desired end use (e.g. absorption of moisture, oxygen, carbon dioxide, nitrogen or other undesired gases or vapors).

The active member 116 (whether desiccant, oxygen scavenger, a releasing material or agent, etc., or combination thereof) is capable of acting on, interacting or reacting with a selected material (e.g., moisture or oxygen). Examples of such actions or interactions may include absorption, adsorption (sorption, generally) or release of the selected material. Each active member 116 can be extruded or molded, for example. Optionally, the active member 116 can be formed in a desired shape or pattern (e.g., on the backing 112) via an in-line melt adhesion thermal bonding process.

The active member 116 can include an "active agent" in a base material. The active agent (i) can be immiscible with the base material (e.g., polymer) and when mixed and heated with the base polymer and a channeling agent, will not melt, i.e., has a melting point that is higher than the melting point for either the base polymer or the channeling agent, and/or (ii) acts on, interacts or reacts with a selected material. The term "active agent" may include but is not limited to materials that absorb, adsorb or release the selected material(s). Active agents according to the presently disclosed technology may be in the form of particles such as minerals (e.g., molecular sieve or silica gel, in the case of desiccants), but the presently disclosed technology should not be viewed as limited only to particulate active agents.

For example, in some embodiments, an oxygen scavenging formulation may be made from a resin which acts as, or as a component of, the active agent.

As used herein, the term “base material” is a component (preferably a polymer) of an entrained active material, other than the active agent, that provides structure and processability (e.g., extrudability or moldability) for the entrained material.

As used herein, the term “base polymer” is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active agent is a water absorbing desiccant. The primary function of the base polymer is to provide structure for the entrained polymer. Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term “channeling agent” or “channeling agents” is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term “channels” or “interconnecting channels” is defined as passages formed of the channeling agent that penetrate through the base polymer and may be interconnected with each other.

As used herein, the term “entrained polymer” is defined as a monolithic material formed of at least a base polymer with an active agent and optionally also a channeling agent entrained or distributed throughout. An entrained polymer thus includes two-phase polymers and three phase polymers. A “mineral loaded polymer” is a type of entrained polymer, wherein the active agent is in the form of minerals, e.g., mineral particles such as molecular sieve or silica gel. The term “entrained material” is used herein to connote a monolithic material comprising an active agent entrained in a base material wherein the base material may or may not be polymeric.

As used herein, the term “monolithic,” “monolithic structure” or “monolithic composition” is defined as a composition or material that does not consist of two or more discrete macroscopic layers or portions. Accordingly, a “monolithic composition” does not include a multi-layer composite.

As used herein, the term “phase” is defined as a portion or component of a monolithic structure or composition that is uniformly distributed throughout, to give the structure or composition it’s monolithic characteristics.

As used herein, the term “selected material” is defined as a material that is acted upon, by, or interacts or reacts with an active agent and is capable of being transmitted through the channels of an entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent (e.g., chlorine dioxide). In embodiments in which an adsorbing material is used as an active agent, the selected material may be certain volatile organic compounds and the adsorbing material may be activated carbon.

As used herein, the term “three phase” is defined as a monolithic composition or structure comprising three or more phases. An example of a three-phase composition according to the presently disclosed technology would be an entrained polymer formed of a base polymer, active agent, and channeling agent. Optionally, a three-phase composition or structure may include an additional phase, e.g., a colorant.

Entrained polymers may be two phase formulations (i.e., comprising a base polymer and active agent, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is hereby incorporated by reference in its entirety.

An entrained material or polymer includes a base material (e.g., polymer) for providing structure, optionally a channeling agent and an active agent. The channeling agent forms microscopic interconnecting channels through the entrained polymer. At least some of the active agent is contained within these channels, such that the channels communicate between the active agent and the exterior of the entrained polymer via microscopic channel openings formed at outer surfaces of the entrained polymer. The active agent can be, for example, any one of a variety of absorbing, adsorbing or releasing materials, as described in further detail below. While a channeling agent is preferred, the invention broadly includes entrained materials that optionally do not include channeling agents, e.g., two phase polymers.

In any embodiment, suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

Suitable active agents according to the presently disclosed technology include absorbing materials, such as desiccating compounds. If the active agent is a desiccant, any suitable desiccant for a given application may be used. Typically, physical absorption desiccants are preferred for many applications. These may include molecular sieves, silica gels, clays and starches. Alternatively, the desiccant may be a chemical compound that forms crystals containing water or compounds which react with water to form new compounds.

Optionally, in any embodiment, the active agent may be an oxygen scavenger, e.g., an oxygen scavenging resin formulation.

Figure 9:
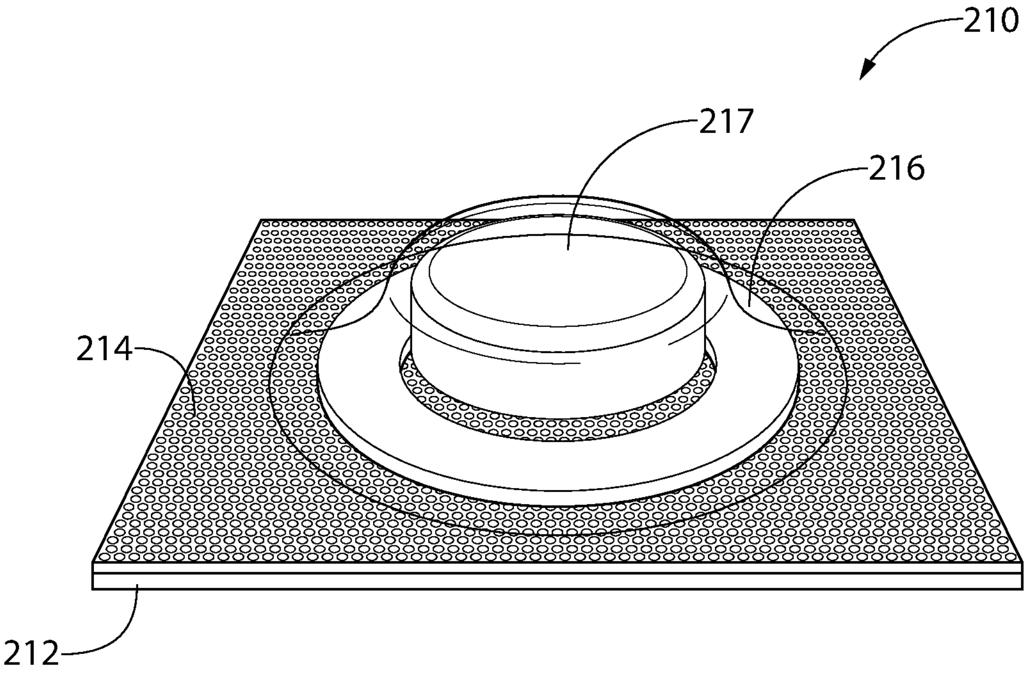
FIG. 9 is a perspective view of a blister pack shown in FIG. 8.
Figure 10:
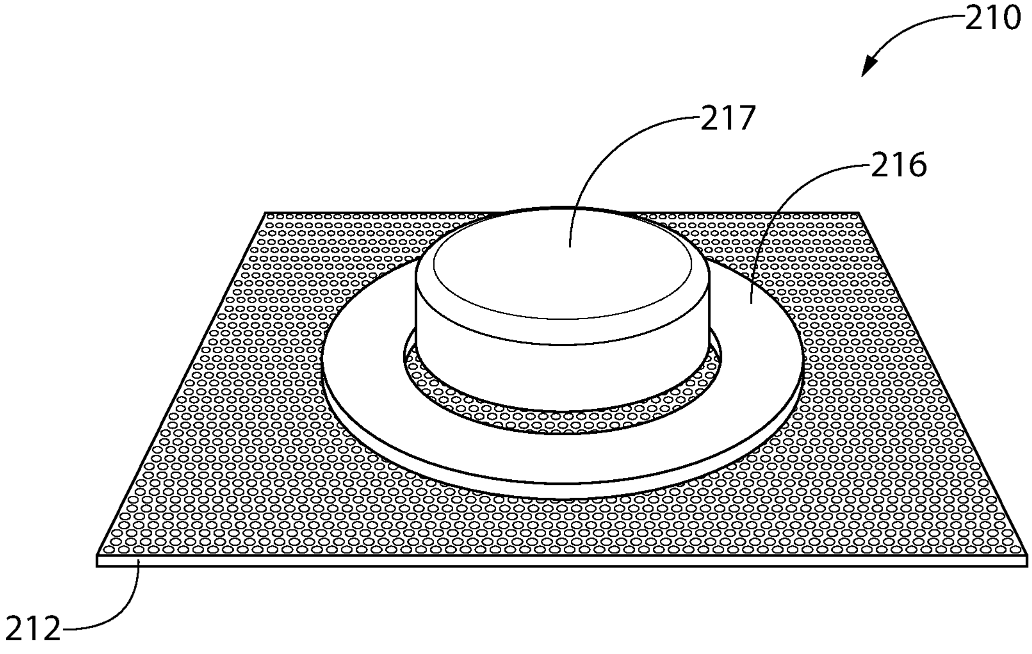
FIG. 10 is a perspective view of a portion of the blister pack shown in FIG. 9.

FIGS. 8-10 show another embodiment of the presently disclosed technology. Similar or identical structure as between the embodiment of FIGS. 5-7 and the embodiment of FIGS. 8-10 is distinguished in FIGS. 8-10 by a reference number with a magnitude one hundred (100) greater than that of FIGS. 5-7. Description of certain similarities between the embodiment of FIGS. 5-7 and the embodiment of FIGS. 8-10 may be omitted herein for convenience and brevity only.

Referring to FIGS. 8-10, each blister 218 can include a blister or dome portion 220 and a base portion 222. The base portion 222 has a different size, shape, configuration, and/or footprint than the dome portion 220. Optionally, at least a section of the base portion 222 extends laterally outwardly beyond the dome portion 220 in the first direction $D_1$. For example, in one embodiment, the base portion 222 has a larger footprint than the dome portion 220, such that the base portion 222 surrounds or encircles the entire dome portion 220. In other words, in such an embodiment, the base portion 222 is longer and wider than the dome portion 220.

Optionally, in such a configuration, when viewing the blister pack 210 from above, each base portion 222 can have the same outer peripheral shape as each dome portion 220, and the difference being that the base portion 222 is larger. Optionally, both the dome portion 220 and the base portion 222 have a generally oval or circular shape when viewed from above. In another embodiment, only a section of the base portion 222 extends laterally outwardly beyond the dome portion 220 in the first direction Di, such that the base portion 222 has a different shape than the dome portion 220 when viewed from above.

Optionally, both the dome portion 220 and the base portion 222 extend outwardly (i.e., upwardly) beyond the first side of the cover 214 and/or away from the backing 212 in the second direction $D_2$. As shown in FIG. 8, the second direction $D_2$ is perpendicular to the first direction $D_1$. In one embodiment, the dome portion 220 extends outwardly beyond or further than the base portion 222 in the second direction $D_2$ away from the first side of the cover 214.

In one embodiment, the dome portion 220 is sized, shaped and/or configured to contain the product 217 therein, while the base portion 222 is not. In other words, in such an embodiment, the size, shape and/or configuration of the base portion 222 does not permit the product(s) 217 to be positioned therein. More particularly, the combined cover 214 attached to the backing 212 forms a cavity therebetween within each blister 218. Each cavity can include at least a product compartment and a base compartment. In one embodiment, at least a section of the base compartment extends outwardly beyond the product compartment in the first direction $D_1$. In one embodiment, the product 217 is positioned entirely in the product compartment. At least a first portion (e.g., a mid-section) of the active member 216 is positioned in or below the product compartment and/or the product 217, and at least a second portion (e.g., one or both outer or lateral ends and/or the outer periphery thereof) of the active member 216 is positioned in the base compartment.

In any one embodiment, at least a portion of a top side or surface of the active member 216 can contact and/or engage at least a portion of an interior surface (underside) of the top wall of the base portion 222 of the blister 218. Optionally, despite this contact, the active member 216 is not (or is only minimally) compressed when positioned in the base portion 222. As such, any contact preferably does not create an airtight seal between the engaged surfaces, so that air may be accessible therebetween. This enables portions of the active member 216 contacting or in close proximity to the top wall to absorb or adsorb, for example, components (e.g., moisture or oxygen) in the air between the engaged surfaces.

In any one embodiment, any contact between the surfaces may result from the base portion 222 having a lower or smaller thickness or height, or the result of the active member 216 being thicker or having a greater height. This configuration permits the concealed active member 216 to have the same or similar active properties or capabilities as the active member 216 of the earlier embodiment. In other words, the functionality of the active member 216 is not hampered by the contact between the active member 216 and the base portion 222.

Employing an active member 216 with a hole extending therethrough allows for the elimination, or at least the reduction, of contact between the product 217 and the active member 216. For example, in one version of the present embodiment, the base portion 222 of each blister 218 can hold the active member 216 stationary, while the dome portion 220 of each blister 218 can hold the product 217 stationary or at least prevent the product 217 from moving a sufficient distance laterally to contact the inner circumference, for example, of the active member 216. Separation or at least a slight lateral spacing between the product 217 and the active member 216 could draw less scrutiny from regulatory agencies, which could reduce time and cost investments to manufacture the presently disclosed technology.

The presently disclosed technology also includes methods of making and/or using the blister packs 110, 210. One of the examplary methods includes (i) providing and/or forming a cover 114, 214 having at least one blister 118, 218 with one or more of the features described above, (ii) placing a product 117, 217 in each blister 118, 218, (iii) placing active material 116, 216 in each blister 118, 218 such that the at least one active member surrounds the product or supports or contacts the product in a depression or indentation of the at least one active member, and (iv) attaching or bonding a backing 112, 212 to the cover 114, 214 to form a sealed package around the product 117, 217.

As used herein, the term "providing" is broadly defined to include receiving, taking and/or using. When a user wishes to access the product 117, 217, at least a portion of the backing 112, 212 can be separated from the cover 114, 214 or broken through to expose the product 117, 217.

The following exemplary embodiments further describe optional aspects of the presently disclosed technology and are part of this Detailed Description. These exemplary embodiments are set forth in a format substantially akin to claims (each set including a numerical designation followed by a letter (e.g., "A," "B," etc.), although they are not technically claims of the present application. The following exemplary embodiments refer to each other in dependent relationships as “embodiments” instead of “claims.”

1A. A blister pack comprising:

a backing;

a cover attached to the backing, the cover and backing in combination forming at least one sealed cavity for containing product therein; and at least one active member within the at least one sealed cavity, the at least one active member including at least one of a depression therein or an opening extending therethrough, wherein the at least one active member is not a pill or medicament.

2A. A blister pack comprising:

a backing;

a cover attached to at least a portion of the backing, the cover and backing in combination forming at least one sealed cavity for containing product therein; and at least one active member within the at least one sealed cavity, the at least one active member including at least one of a depression therein or an opening extending therethrough.

2B. The blister pack of embodiment 2A, wherein the sealed cavity includes a dome portion and a base portion, at least a section of the base portion extending beyond the dome portion in a first direction, the dome portion extending beyond an outer peripheral portion of the cover in a second direction, the second direction being perpendicular to the first direction, the base portion extending beyond the outer peripheral portion of the cover in the second direction, and wherein the at least one active member is within at least the base portion of the sealed cavity.

2C. The blister pack of embodiment 2B, wherein at least a first portion of the active member is positioned in the base portion of the cavity, and wherein at least a second portion of the active member is positioned in or beneath the dome portion of the cavity.

2D. The blister pack of embodiment 2B, wherein the product is positionable entirely in the dome portion of the cavity.

2E. The blister pack of embodiment 2B, wherein the base portion is formed by a depression or cut-out in the backing.

3A. A method of making a blister pack, the method comprising:

providing a thermoformed or foil cover including a plurality of blisters;

placing product in each blister of the cover;

placing at least one active member in each blister of the cover such that the at least one active member surrounds at least a portion of the respective product or supports the respective product in a depression of the at least one active member;

attaching a backing to the cover to form a sealed cavity around the product and the at least one active member in each blister.

3B. The method of embodiment 3A, wherein the active member is adhered to the backing.

3C. The method of embodiment 3A or 3B, wherein each active member is in the form of a ring with an opening extending therethrough.

3D. The method of any one of embodiments 3A-3C, wherein the active member is molded.

4A. A blister pack comprising:

a backing;

a cover attached to at least a portion of the backing, the cover and backing in combination forming at least one sealed cavity for containing at least one product therein; and at least one active member within the at least one sealed cavity, the at least one active member including at least one of a depression therein or an opening extending therethrough.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the presently disclosed technology as defined by the appended claims.

What is claimed is:

1. A method of forming a blister pack configured to absorb or adsorb moisture therein, the method comprising:

adhering a moisture-absorbing or moisture-adsorbing desiccant entrained polymer film to a backing;

inserting a single pill, capsule, or tablet into a cavity formed in a thermoformed cover, the cavity including a dome portion and a base portion, at least a section of the base portion extending beyond the dome portion in a first direction, the dome portion extending beyond an outer peripheral portion of the cover in a second direction, the second direction being perpendicular to the first direction; and attaching the backing to the cover so that the moisture-absorbing or moisture-adsorbing desiccant entrained polymer film and the single pill, capsule, or tablet is enclosed in the cavity, the base portion being configured to receive at least a portion of the moisture-absorbing or moisture-adsorbing desiccant entrained polymer film therein wherein the base portion includes a top wall that extends parallel to the backing, and wherein an interior surface of the top wall is spaced-apart from the backing such that at least a portion of the moisture-absorbing or moisture-adsorbing desiccant entrained polymer film extends between the interior surface of the top wall of the base portion and the backing.

2. The method of claim 1, wherein the blister pack includes an upright configuration and an upside down configuration, in the upright configuration the single pill, capsule, or tablet is configured to contact an interior surface of the backing, in the upside down configuration the single pill, capsule, or tablet is configured to contact an interior surface of the cover, and wherein, when the blister pack is in the upright configuration, a bottom surface of the single pill, capsule, or tablet is configured to be coplanar with a bottom surface of the cover.

3. The method of claim 1, wherein the cover is attached to at least a portion of a top surface of the backing, and the moisture-absorbing or moisture-adsorbing desiccant entrained polymer film is attached to the top surface of the backing.

4. The method of claim 1, wherein at least one sealed cavity is formed, the at least one sealed cavity including a product compartment and wherein at least a first portion of the moisture-absorbing or moisture-adsorbing desiccant entrained polymer film is positioned in the product compartment.

5. The method of claim 1, wherein the moisture-absorbing or moisture-adsorbing desiccant entrained polymer film is an extruded film with a thickness of 0.2 mm to 1.2 mm.

6. The method of claim 1, wherein the moisture-absorbing or moisture-adsorbing desiccant entrained polymer film comprises molecular sieve or silica gel that is present in an amount of 30-80% by weight of the entrained polymer.

7. The method of claim 1, wherein the moisture-absorbing or moisture-adsorbing desiccant entrained polymer film comprises a polymer channeling agent that forms channels within the entrained polymer.

8. The method of claim 1, wherein the backing is a foil backing.

9. The method of claim 1, wherein the backing is formed of a plastic material.

10. The method of claim 1, wherein a top surface of the moisture-absorbing or moisture-adsorbing desiccant entrained polymer film is configured to contact an interior surface of a top wall of the base portion.

* * * * *